United States Patent
Golab et al.

(10) Patent No.: US 8,856,071 B2
(45) Date of Patent: Oct. 7, 2014

(54) MINIMIZING STALENESS IN REAL-TIME DATA WAREHOUSES

(75) Inventors: Lukasz Golab, Morris Plains, NJ (US); Mohammad Hossein Bateni, Princeton, NJ (US); Mohammad Hajiaghayi, Florham Park, NJ (US); Howard Karloff, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 941 days.

(21) Appl. No.: 12/539,429

(22) Filed: Aug. 11, 2009

(65) Prior Publication Data

US 2011/0040727 A1    Feb. 17, 2011

(51) Int. Cl.
    *G06F 17/30*    (2006.01)
(52) U.S. Cl.
    CPC ............................... *G06F 17/30445* (2013.01)
    USPC ........................................................ 707/618
(58) Field of Classification Search
    USPC ........................................................ 707/618
    See application file for complete search history.

(56) References Cited

U.S. PATENT DOCUMENTS

| 5,781,911 A | 7/1998 | Young et al. |
| 6,470,333 B1 | 10/2002 | Baclawski |
| 6,839,724 B2 | 1/2005 | Manchanda et al. |
| 7,003,560 B1 | 2/2006 | Mullen et al. |
| 7,111,019 B1 | 9/2006 | Nishizawa et al. |
| 7,136,866 B2 | 11/2006 | Springer, Jr. et al. |
| 7,421,458 B1 | 9/2008 | Taylor et al. |
| 7,557,729 B2 | 7/2009 | Hubbard et al. |
| 7,698,163 B2 | 4/2010 | Reed et al. |
| 7,769,625 B2 | 8/2010 | Veit |
| 7,822,712 B1 | 10/2010 | Robinson et al. |
| 7,882,103 B2 | 2/2011 | Brobst |
| 2003/0083925 A1 | 5/2003 | Weaver et al. |
| 2003/0187862 A1* | 10/2003 | Brobst .......................... 707/102 |
| 2004/0034650 A1 | 2/2004 | Springer, Jr. et al. |
| 2004/0103051 A1 | 5/2004 | Reed et al. |
| 2004/0148195 A1 | 7/2004 | Kalies |
| 2004/0210607 A1* | 10/2004 | Manchanda et al. .......... 707/203 |
| 2004/0267714 A1 | 12/2004 | Frid et al. |
| 2005/0197900 A1 | 9/2005 | Veit |
| 2005/0234837 A1 | 10/2005 | Ramachandran et al. |
| 2005/0262433 A1 | 11/2005 | Suzuki et al. |
| 2006/0253435 A1* | 11/2006 | Nishizawa et al. ............... 707/3 |
| 2007/0073767 A1 | 3/2007 | Springer, Jr. et al. |
| 2008/0244433 A1 | 10/2008 | Behnen et al. |
| 2009/0299969 A1* | 12/2009 | Le ..................................... 707/3 |
| 2010/0135472 A1 | 6/2010 | Watanabe |
| 2011/0040727 A1 | 2/2011 | Golab et al. |
| 2011/0125741 A1 | 5/2011 | Brobst |

\* cited by examiner

*Primary Examiner* — Ajay Bhatia
*Assistant Examiner* — Kurt Mueller
(74) *Attorney, Agent, or Firm* — Scott P. Zimmerman, PLLC (57) ABSTRACT

Data tables in data warehouses are updated to minimize staleness and stretch of the data tables. New data is received from external sources and, in response, update requests are generated. Accumulated update requests may be batched. Data tables may be weighted to affect the order in which update requests are serviced.

16 Claims, 4 Drawing Sheets

1. Partition the tables into groups $T_1, T_2, \ldots, T_g$, where the period of updates for the tables in each group has a multiplicative range of no more than 2.
2. Assign $p_i = \left\lceil \frac{(p-g)|T_i|}{\tau} \right\rceil$ processors to tables of group $i$.
3. Handle the updates in each group independently, according to algorithm MYOPIC.

FIG. 5

MINIMIZING STALENESS IN REAL-TIME DATA WAREHOUSES

BACKGROUND

1. Field of the Disclosure

The present disclosure relates to updating data warehouses.

2. Description of the Related Art

Data warehouses store data tables that contain data received from external sources. As an example, the data may relate to network performance parameters.

DESCRIPTION OF EXEMPLARY EMBODIMENTS

In a particular embodiment, a disclosed method updates data tables stored in a data warehouse. The data warehouse may be a real-time data warehouse. The method includes receiving data for updating the data tables, generating update requests responsive to the receiving, calculating a staleness for a portion of the data tables, and scheduling data table updates on a plurality of processors based at least in part on the calculated staleness and the update requests. The method further includes transforming the data tables based on the scheduled data table updates to include a portion of the received data.

Generally, the staleness is indicative of an amount of time elapsed since the previous update of the data tables. Update requests may be assumed non-preemptible and accumulated update requests are batched together. The method may further include determining a stretch value for the update request, wherein the stretch value is indicative of the maximum ratio between the duration of time an update waits until it is finished being processed and the length of the update.

Further embodiments relate to a server for managing a data warehouse. The server includes a memory for storing the data warehouse, which includes a plurality of data tables. An interface receives data for updating the data tables and a processor for calculating a staleness for a portion of the data tables responsive to receiving data on the interface. Further instructions are for weighting a portion of the calculated stalenesses and scheduling data table updates for completion by a plurality of processors based at least in part on the weighted stalenesses. Accumulated update requests from the generated update requests are batched together.

To provide further understanding of disclosed systems, data warehouses and aspects related to updating data tables are discussed. Data warehouses integrate information from multiple operational databases to enable complex business analyses. In traditional applications, warehouses are updated periodically (e.g., every night) and data analysis is done off-line. In contrast, real-time warehouses continually load incoming data feeds for applications that perform time-critical analyses. For instance, a large Internet Service Provider (ISP) may collect streams of network configuration, performance, and alarm data. New data must be loaded in a timely manner and correlated against historical data to quickly identify network anomalies, denial-of-service attacks, and inconsistencies among protocol layers. Similarly, on-line stock trading applications may discover profit opportunities by comparing recent transactions against historical trends. Finally, banks may be interested in analyzing streams of credit card transactions in real-time to protect customers against identity theft.

The effectiveness of a real-time warehouse depends on its ability to make newly arrived data available for querying. Disclosed embodiments relate to algorithms for scheduling updates in a real-time data warehouse in a way that 1) minimizes data staleness and 2) under certain conditions, ensures that the "stretch" (delay) of each update task is bounded. In some cases, disclosed systems seek to schedule the updating of data tables to occur within a constant factor of an optimal solution for minimizing staleness and stretch.

Data warehouses maintain sets of data tables that may receive updates in an online fashion. The number of external sources may be large. The arrival of a new set of data records may generate an update request to append the new data to the corresponding table(s). If multiple update requests have accumulated for a given table, the update requests are batched together before being loaded. Update requests may be long-running and are typically non-preemptible, which suggests that it may be difficult to suspend a data load, especially if it involves a complex extract transform-load process. There may be a number p processors available for performing update requests. At any time t, if a table has been updated with data up to time r (i.e., the most recent update request arrived at time r), its staleness is t−r.

Given the above constraints, some embodied systems solve the problem of non-preemptively scheduling the update requests on p processors in a way that minimizes the total staleness of all the tables over time. If some tables are more important than others, scheduling may occur to prioritize updates to important tables and thereby minimize "priority-weighted" staleness.

Some disclosed systems use scheduling algorithms to minimize staleness and weighted staleness of the data in a real-time warehouse, and to bound the maximum stretch that any individual update may experience.

On-line non-preemptive algorithms that are not voluntarily idle can achieve an almost optimal bound on total staleness. Total weighted staleness may be bounded in a semi-offline model if tables can be clustered into a "small" number of groups such that the update frequencies within each group vary by at most a constant factor.

In the following description, details are set forth by way of example to facilitate discussion of the disclosed subject matter. It should be apparent to a person of ordinary skill in the art, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
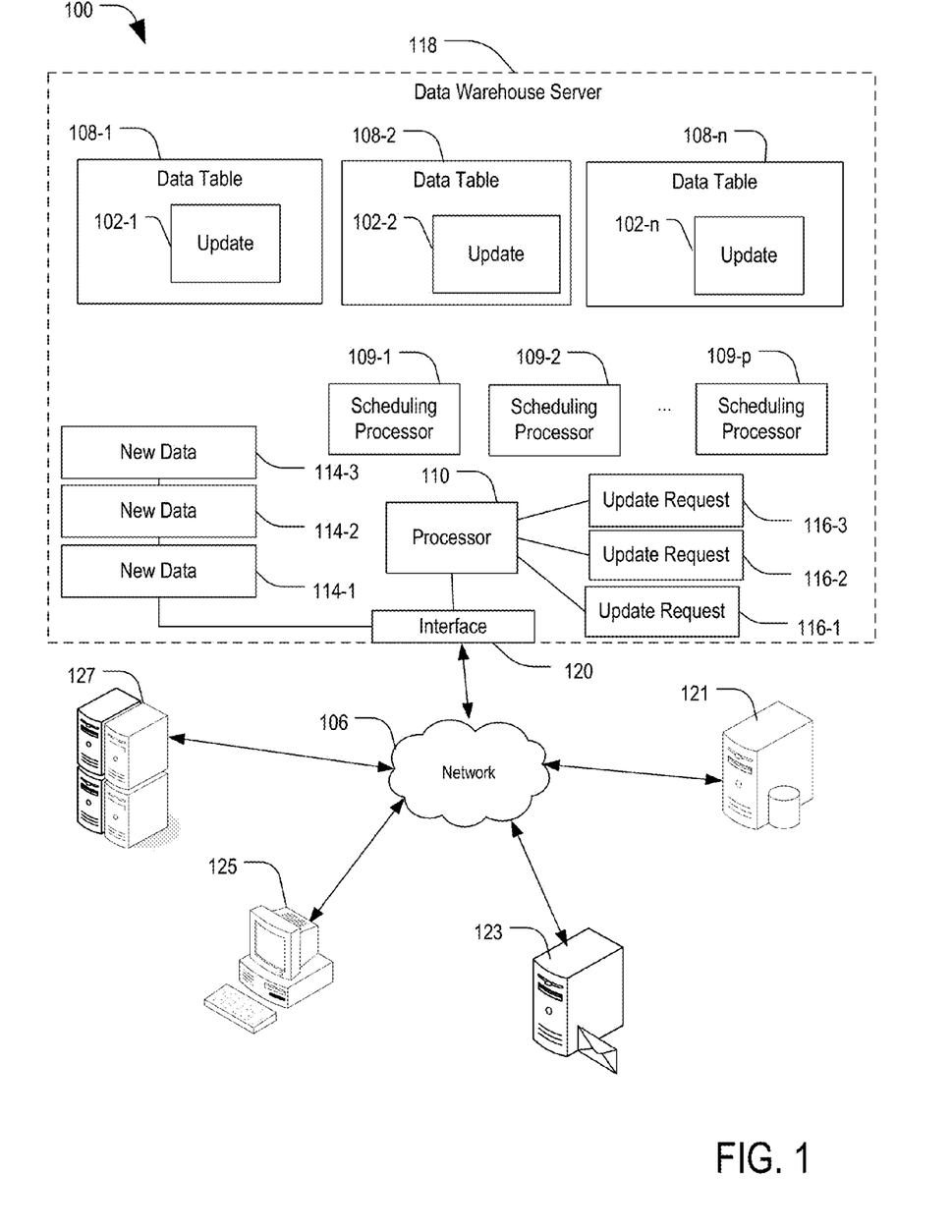
FIG. 1 illustrates a data warehouse server that receives data and updates data tables in accordance with disclosed embodiments.

FIG. 1 illustrates system 100 that includes data warehouse server 118, which as shown maintains a real-time data warehouse. Data warehouse server 118 receives data (over interface 120 through network 106 from server 127) from multiple external sources including data processing system 125, storage server 121, and mail server 123. The received data is stored as new data 114 by processor 110, which also generates update requests 116. Data warehouse server 118 accesses a computer readable medium (not depicted) embedded with computer instructions for managing data tables 108. A particular embodiment includes instructions that maintain data tables 108 as a data warehouse and receive requests with new data 114 for updating a portion of data tables 108. Further instructions generate update requests 116 that correspond to the received data. Staleness values are calculated for individual data tables of data tables 108. For example, staleness values can be calculated for data tables 108-2 and 108-1. The calculated stalenesses can be ranked or compared to a threshold, as examples. Further instructions schedule updating of data tables 108 with updates 102. The scheduling of updating data tables 108 may be based on the ranked stalenesses.

With the addition of updates 102, portions of data tables 108 are transformed based on the scheduling and the update requests 116. Update requests 116, in some embodiments, are for appending new data 114 to data tables 108 as updates 102.

In some embodiments, a stretch value for one or more of data tables 108 is determined and ranking data tables 108 is based at least in part on the calculated stretch. In some embodiments, the calculated stretch value the maximum ratio between the duration of time an update (e.g., an update based on update request 116-3) waits until it is finished being processed and the length of the update. Data warehouse server 118 may batch together accumulated portions of the generated update requests 116. New data 114 is distributed to data tables 108 as updates 102 by the scheduling processors 109 to minimize staleness. As shown, there are a number p processors, which is indicated by scheduling processor 109-$p$.

In some embodiments, update requests 116 are assumed non-preemptible. A portion of data tables 108 may be analyzed for a staleness value indicative of an amount of time elapsed since a previous update of the portion of data tables. A first portion of data tables 108 (e.g., data table 108-1) may be weighted higher than a second portion of the data tables (e.g., data table 108-2), and the scheduling processors 109 can schedule updates to these data tables responsive to the weighting results.

Figure 2:
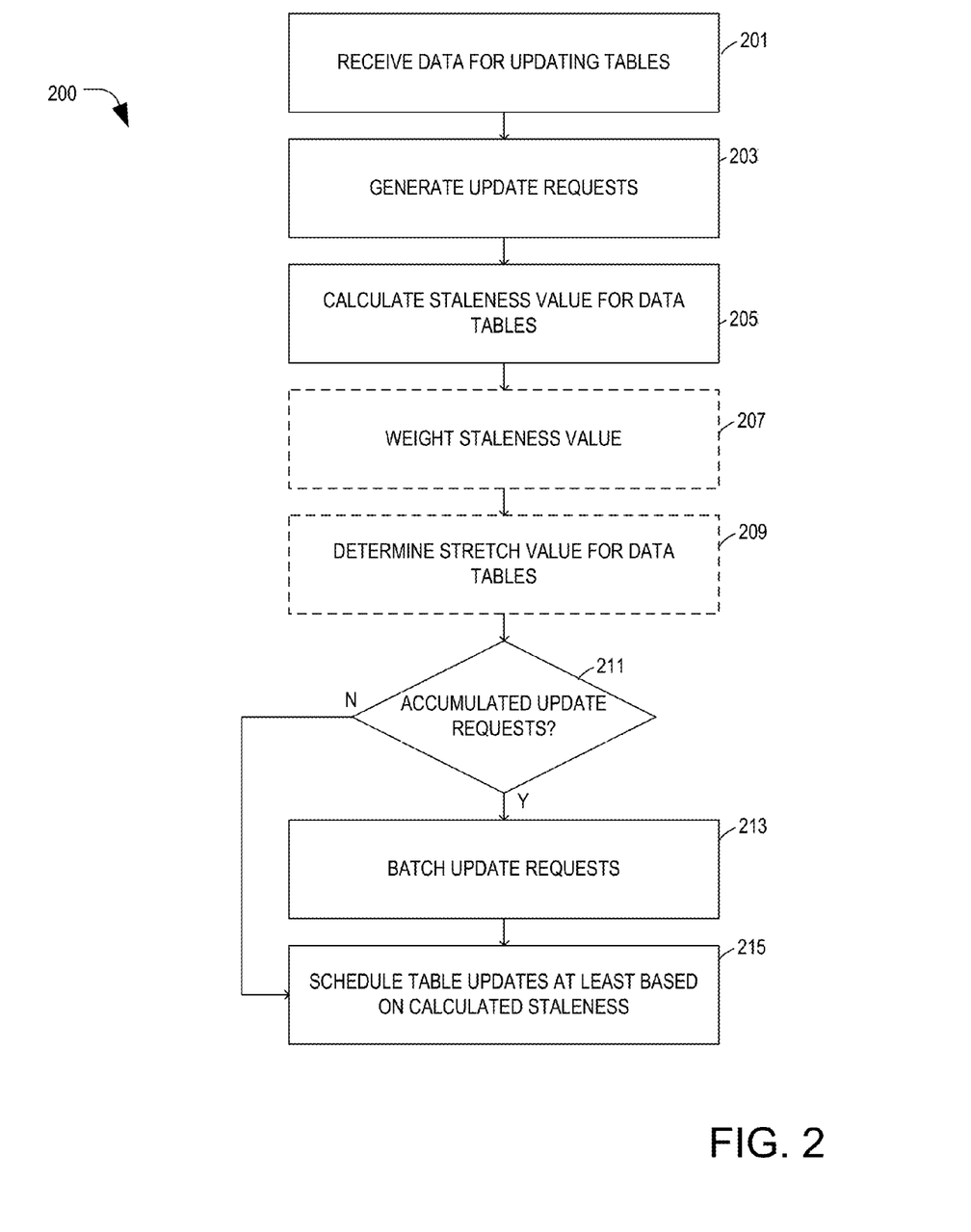
FIG. 2 depicts elements of a method for updating data tables in a data warehouse in accordance with disclosed embodiments.

Illustrated in FIG. 2 is a method 200 is for updating data tables (e.g., data tables 108 in FIG. 1). Data is received (block 201) for updating the data tables. Responsive to receiving (block 201) the data, update requests are generated (block 203). The generated update requests may be non-preemptible. A staleness value is calculated (block 205) for a portion of the data tables. Optionally, the staleness values are weighted (block 207) and a stretch value is calculated (block 209) for data tables. Weighting may occur by multiplying a first data table staleness by a first weight and multiplying a second data table staleness by a second weight. The stretch value can be calculated which indicates the maximum ratio between the duration of time an update waits until it is finished being processed and the length of the update. A determination is made (block 211) whether there are accumulated update requests. If there are accumulated update requests, the accumulated update requests are batched (block 213). Data table updates are scheduled (block 215) for the update requests (as shown, whether batched or not) based at least in part on the calculated stalenesses. The updates may be scheduled to occur at variable intervals.

Figure 3:
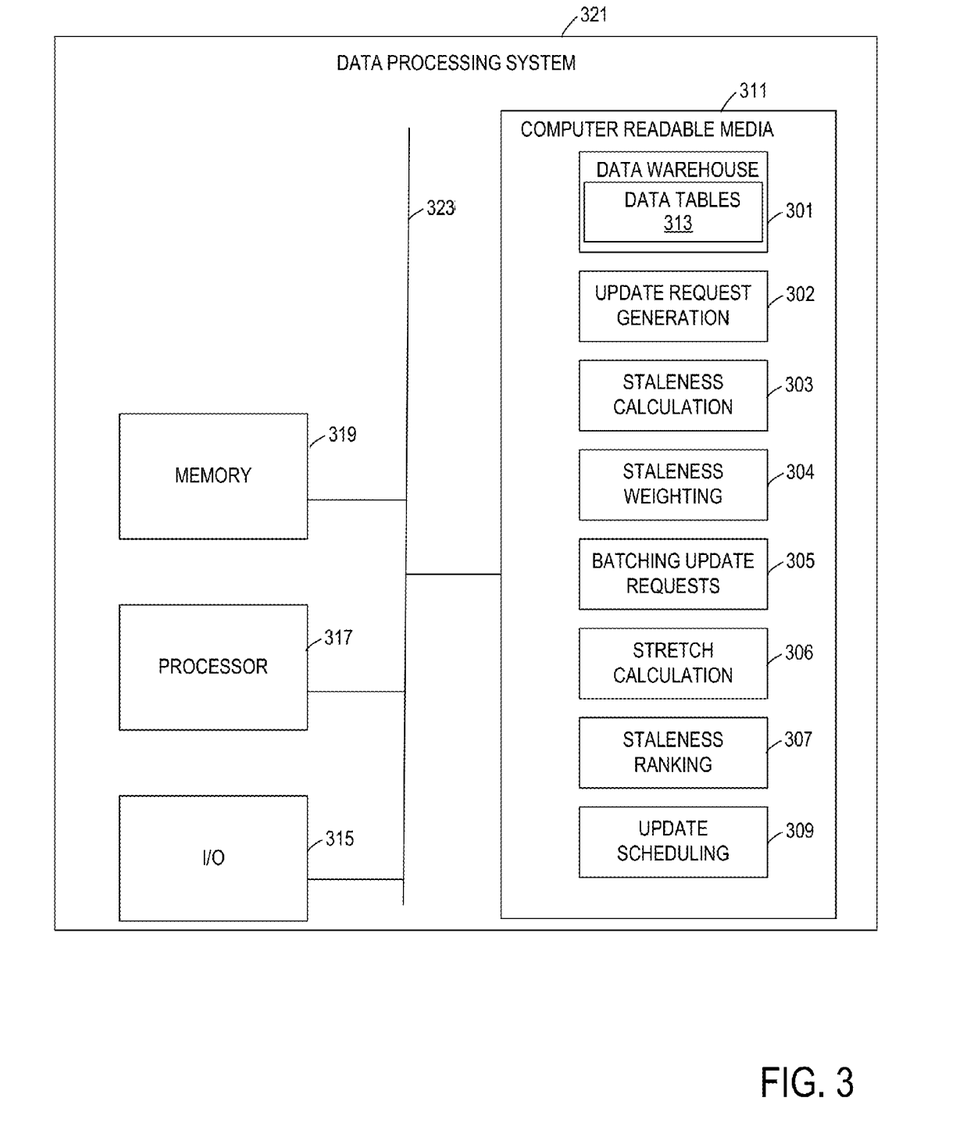
FIG. 3 illustrates selected elements of a data processing system provisioned as a data warehouse server for updating data tables in accordance with disclosed embodiments.

Referring now to FIG. 3, data processing system 321 is provisioned as a server for managing a data warehouse. As shown, the server includes a computer readable media 311 for storing the data warehouse 301 which has a plurality of data tables 313. The server further has an input/output interface 315 for receiving data for updating the data tables and a processor 317 that is enabled by computer readable instructions stored in computer readable media 311. Processor 317 is coupled via shared bus 323 to memory 319, input/output interface 315, and computer readable media 311. It will be noted that memory 319 is a form of computer readable media 311. In operation, responsive to input/output interface 315 receiving new data, staleness calculation module 303 calculates a staleness for a portion of data tables 313. Staleness weighting module 304 optionally weights a portion of the calculated stalenesses. Staleness ranking module 307 ranks the stalenesses. Update scheduling module 309 schedules data table updates for completion by a plurality of processors based at least in part on the weighted stalenesses. Update request generation module 302 generates update requests for newly received data. In some embodiments, update requests may be batched together by batching update requests module 305. Stretch calculations may be performed for a portion of the data tables 313 by stretch calculation module 306. Accordingly, update scheduling module 309 may schedule data table updates based at least in part on the stretch value. The calculated stretch value, in some embodiments, represents the maximum ratio between the duration of time an update waits until it is finished being processed and the length of the update.

In disclosed methods including method 200, updating the data tables may include appending new data to corresponding data tables. The staleness can be indicative of an amount of time elapsed since a previous update of the data tables. Some embodied methods include scheduling data table updates on p processors based at least in part on the calculated staleness and the update requests. Updating the data tables with the new data transforms the data tables based on the scheduled data table updates to include a portion of received data. Disclosed methods may include weighting a first portion of the data tables higher than a second portion of the data tables, wherein the scheduling is at least in part based upon the weighting.

Further embodiments relate to computer instructions stored on a computer readable medium for managing a plurality of data tables in a data warehouse. The computer instructions enable a processor to maintain a plurality of data tables in the data warehouse, receive data for updating a portion of the plurality of data tables, and generate update requests corresponding to the received data. For individual data tables, a staleness for the data table is calculated and ranked. Updating the data tables is scheduled based on the ranked stalenesses, and the data table is transformed (e.g., appended with new data) based on the updating. A stretch value may be calculated for a portion of individual data tables. The stretch value is indicative the maximum ratio between the duration of time an update waits until it is finished being processed and the length of the update. Further instructions allow for accumulated update requests to be batched and processed together. A portion of update requests may be non-preemptible.

Calculations and other aspects of updating data warehouses are touched on for a better understanding of disclosed systems. Suppose a data warehouse consists of t tables and p processors, and that p≤t. Each table i receives update requests at times $r_{i1} < r_{i2} < \ldots < r_{i,ki}$, where $r_{i0} = 0 < r_{i1}$. An update request at time $r_{ij}$ contains data generated between times $r_{i,j-1}$ and $r_{ij}$. The length of this update is defined as $r_{ij} - r_{i,j-1}$. Associated with each table i is a real $\alpha_i \leq 1$ such that processing an update of length L takes time at most $\alpha_i L$. The constants $\alpha_i$ need not be the same. For example, some data feeds may produce more data records per unit time, meaning that updates will take longer to load. At any point in time, an idle processor may decide which table it wants to update, provided that at least one update request for this table is pending. At time $\tau$, table i may be picked, and the most recently loaded update may arrive at time $r_{ij}$. A processor would need to non-preemptively perform all the update requests for table i that have arrived between time $r_{ij}+1$ and $\tau$, and there could be one or more pending requests. These pending update requests may be referred to as a "batch" with its length defined as the sum of the lengths of the pending update requests. In practice, batching may be more efficient than separate execution of each pending update. When the entire batch has been loaded, the processor can choose the next table to update.

Figure 4A:
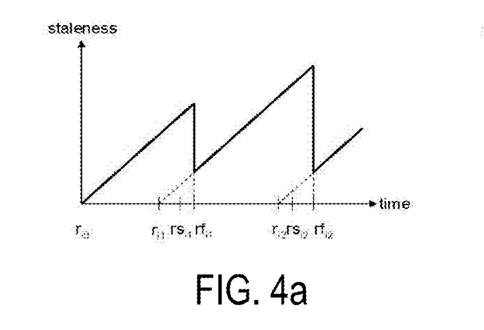
FIG. 4a is a graph of staleness values related to data tables in a data warehouse.
Figure 4B:
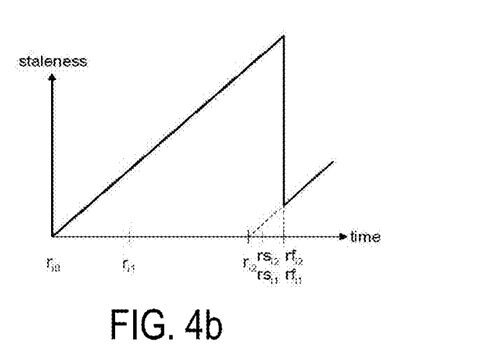
FIG. 4b is a further graph of staleness values related to data tables in a data warehouse.

At any time $\tau$, the staleness of table i is defined $\tau-r$, where r is the arrival time of the most recent update request rij that has been loaded. FIG. 4(a) illustrates the behavior of the staleness function of table i over time. The total staleness for this table is simply the area under the staleness curve. Suppose that table i is initialized at time $ri_0=0$. Let rsij and $rf_{ij}$ denote the times that update $r_{ij}$ starts and finishes processing, respectively. As can be seen, staleness accrues linearly until the first update is loaded at time $rf_{i1}$. At this time, staleness does not drop to zero; instead, it drops to $rf_{i1}-r_{i1}$. In contrast, FIG. 4(b) shows the staleness of table i assuming that the first two updates were batched. In this case, $rs_{i2}=rs_{i1}$ and $rf_{i2}=rf_{i1}$; conceptually, both update requests start and finish execution at the same times. Observe that staleness accrues linearly until the entire batch has been loaded. Clearly, total staleness is higher in FIG. 4(b) because the first update has been delayed.

The flow time of a task can be defined as the difference between its completion time and release time, and the stretch of a task is the ratio of its processing time to the flow time. Stretch measures the delay of the task relative to its processing time. These definitions may be slightly modified for various update tasks disclosed herein. For example, the flow time of an update request arriving at time $r_{ij}$ may be redefined as the "standard" flow time plus the length of the update, i.e., $rs_{ij}-r_{i,j-1}$. Furthermore, the stretch of said update request may be redefined as the "standard" stretch plus the length of the update, i.e.:

$$\frac{(rf_{ij}-rs_{ij})+(r_{ij}-r_{i,j-1})}{rf_{ij}-r_{i,j-1}}.$$

Given the above definitions, the total staleness of table i in some time interval is upper-bounded by the sum of squares of the flow times (using the modified definition of flow time) of update requests in that interval. There are no known competitive algorithms for minimizing the L2 norm of "standard" flow time; however, any non-preemptive algorithm that is not voluntarily idle may nearly achieve the optimistic lower bound on total staleness.

There are competitive algorithms for minimizing the $L_2$ norm of flow times of all the update requests, using the modified definition of flow times defined previously. An algorithm is so-called "opportunistic" if it leaves no processor idle while a performable batch exists.

For any fixed $\beta$ and $\delta$ such that $0<\beta,\delta<1$, $C_{\beta,\delta}=\sqrt{\delta}(1-\beta)/\sqrt{6}$ may be defined. Given a number p of processors and t of tables, $\alpha:=(p/t)\min\{C_{\beta,\delta},\frac{1}{4}\}$ may be defined. Then, provided that each $\alpha_i<\alpha$, the competitive ratio of any opportunistic algorithm is at most $$(1+\alpha)^2 \frac{1}{\beta^4} \frac{1}{1-\delta}.$$

Any choice of constant parameters $\beta$ and $\delta$ results in a constant competitive ratio. Note that as $\beta \to 1$ and $\delta \to 0$, $\alpha$ approaches 0 and hence the competitive ratio approaches 1.

The penalty (i.e., sum of squares of flow times) of a given algorithm may be compared to a simple lower bound. Let A be the set of all updates. Independent of their batching and scheduling, each update i of length $a_i$ needs to pay a minimum penalty of $a_i^2$. This follows from the convexity of the square function. If a set of updates are batched together, it may be necessary to pay no less than the sum of the squares of the updates' lengths. Therefore, $$\text{LOW} := \sum_{i \in A} a_i^2 \leq OPT. \quad (1)$$

Looking at the cost a particular solution is paying, let B be the set of batches in the solution. For a batch $B_i \in B$, let $J_i$ be the first update in the batch, having length $c_i$. This batch is not applied until, for example, $d_i$ time units have passed since the release of $J_i$. The interval of size $d_i$ starting from the release of update $J_i$ is called the "delay interval" of the batch $B_i$, and $d_i$ is called the "delay" for this batch. As for the length of the batch, denoted by $b_i$, the following applies:

$$c_i \leq b_i \leq c_i + d_i. \quad (2)$$

For the penalty of this batch, denoted by $\rho_i$, the following applies:

$$\rho_i = [(c_i + d_i) + \alpha b_i]^2, \quad \text{by the definition of penalty,} \quad (3)$$

$$\leq (1+\alpha)^2 (c_i + d_i)^2 \text{ by (2).} \quad (4)$$

Considering the case of one processor and two tables, if the updates of one table receive a large delay, it may indicate that the processor was busy applying updates from the other table (because it may be desirable for an applied algorithm to avoid remaining idle if it can perform something). Therefore, these jobs which are blocking the updates from the first table can pay (using their own sum-of-squares budget originally coming from the lower bound on OPT) for the penalty of a disclosed solution. It may be problematic if updates from the other tables (which are responsible for the payment) might be very small pieces whose sum of squares is not large enough to make up for the delay experienced (consider that the sum of their unsquared values is comparable to the delay amount). There may only be two batches, one of which is preferably large, occurring while a job of table 1 is being delayed. Another caveat is that the budget—the lower bound (LOW)—is $\Sigma_{i \in A} a_i^2$, rather than $\Sigma_{i \in B} b_i^2$, which may be much larger. If each of these batches is not much larger than its first piece (i.e., $b_i = \Theta(c_i)$), then by losing a constant factor, the length of the batch can be ignored, and job sizes may be adjusted. Otherwise, this batch has a large delay and some other batches should be responsible for this large delay. It may be preferable to have those other batches pay for the current batch's delay. This indirection might have more than one level, but may not be circular.

Each job $i \in A$ has a budget of $a_i^2$ units. A batch $B_i \in B$ by (4), may need to secure a budget which is proportional to $(c_i+d_i)^2$. These conditions may be relaxed slightly in the following: A so-called "charging scheme" specifies what fraction of its budget each job pays to a certain batch. Let a batch $B_i$ be "tardy" if $c_i < \beta(c_i + d_i)$ (where $\beta$ comes from the statement above); otherwise it is "punctual." Let us denote these sets by $B_t$ and $B_p$ respectively. More formally, a charging scheme is a matrix $(v_{ij})$ of nonnegative values, where $v_{ij}$ shows the extent of dependence of batch i on the budget available to batch j, with the following two properties.

1. For any batch $B_i \in B$, $$(c_i + d_i)^2 \leq \sum_{j \in B_p} v_{ij} b_j^2, \text{ and} \qquad (5)$$

2. There exists a constant $\lambda > 0$ such that, for any punctual batch $B_j$, $$\sum_{i \in B} v_{ij} \leq \lambda. \qquad (6)$$

The existence of a charging scheme with parameters $\beta$ and $\lambda$ gives a competitive ratio of at most $$(1+\alpha)^2 \frac{1}{\beta^2} \lambda$$

for an opportunistic algorithm.
Let:

$$\rho_i \leq (1+\alpha)^2 (c_i + d_i)^2 \quad \text{by (4);} \qquad (7)$$

$$\leq (1+\alpha)^2 \sum_{j \in B_p} v_{ij} b_j^2 \quad \text{by (5);} \qquad (8)$$

$$\leq (1+\alpha)^2 \sum_{j \in B_p} v_{ij} \frac{1}{\beta^2} c_j^2 \quad \text{by (2) and definition of punctuality.} \qquad (9)$$

Hence, the total cost of a solution is $$\sum_{i \in B} \rho_i \leq (1+\alpha)^2 \frac{1}{\beta^2} \sum_{j \in B_p} c_j^2 \sum_{i \in B} v_{ij} \quad \text{by (9)} \qquad (10)$$

$$\leq (1+\alpha)^2 \frac{1}{\beta^2} \lambda \sum_{j \in B_p} c_j^2 \quad \text{by (6)} \qquad (11)$$

$$\leq (1+\alpha)^2 \frac{1}{\beta^2} \lambda \cdot LOW \quad \text{by (1)} \qquad (12)$$

$$\leq (1+\alpha)^2 \frac{1}{\beta^2} \lambda \cdot OPT \quad \text{by (1).} \qquad (13)$$

The "execution interval of a batch B" may be defined as the time interval during which the batch B is being processed. Accordingly, its length is $\alpha_i$ times the length of B, if the update belongs to table i.

Batch B blocks batch B' if B's execution interval has intersection of positive length with the delay interval of B'. Note that many batches can block a given batch B'. A charging scheme with the desired properties may be introduced. This is done by defining how $v_{ij}$ values are computed. If a batch $B_i$ is punctual, this may be relatively straightforward: all $v_{ij}$ values are zero except for $v_{ii} = 1/\beta^2$. Take a tardy batch $B_i$. In this case $d_i$ is large compared to $c_i$. During the interval of length $d_i$, during which $J_i$ is waiting (i.e., the delay interval of batch $B_i$), all p processors should be busy. Let [r, r'] denote this interval. The total time is $pd_i$. A relaxed version of this bound may be used to draw the conclusion (e.g., established by equation (6)).

A weighted directed graph with one node for each batch may be built. Punctual batches may be denoted as sinks (i.e., denoted as having no outarcs). Any tardy batch has arcs to all the batches blocking it, and there is at least one, since it has positive $d_i$. Even though punctual batches may be blocked by other batches, they have no outarcs.

The result is a so-called "directed acyclic graph" (DAG), because along any directed path in the graph, the starting (execution) times of batches are decreasing. The weight $w_e$ on any such arc e is the fraction, between 0 and 1, of the blocking batch which is inside the delay interval [r, r'] of the blocked batch). Also, there is a parameter $\gamma$, $$\gamma := \frac{6t\alpha^2}{p^2}\left(\frac{1}{1-\beta}\right)^2. \qquad (14)$$

Then, for any two batches i and j, $v_{ij}$ is defined as $$v_{ij} = \frac{1}{\beta^2} \sum_{p \in P_{ij}} \prod_{e \in p} (\gamma w_e^2), \qquad (15)$$

where $P_{ij}$ denotes the set of directed paths from i to j. The dependence along any path is the square of the product of weights on the path multiplied by $\gamma$ to the power of the length of the path. This definition includes as a special case the definition of the $v_{ij}$'s for punctual batches i, since there is a path of length zero between any batch i and itself (giving $v_{ii} = 1/\beta^2$) and no path from batch i to batch j for any $j \neq i$ (giving $v_{ij} = 0$ if $j \neq i$).

Such a charging scheme may satisfy the desired properties as shown: The cost paid for each batch should be accounted for using the budget it secures, as required above in (5).

For any batch $B_i \in B$, $$(c_i + d_i)^2 \leq \sum_{j \in B_p} v_{ij} b_j^2,$$

If $B_1, \ldots, B_k$ are the children of $B_0$, having weights $w_1, \ldots, w_k$, respectively, in a run of any opportunistic algorithm, then $$\sum_{j'=1}^{k} (w_{0j'} b_{j'})^2 \geq \frac{p^2 d_0^2}{6t\alpha^2}.$$

By the definition of the $w_e$'s, the construction of the graph, the fact that $B_1, B_2, \ldots, B_k$ are all the batches blocking $B_0$, and the fact that the k blocking batches are run on p processors in a delay interval of length $d_0$ (so that their actual lengths must sum to at least $1/\alpha$ times as much), it can be expressed that:

$$\sum_{j'=1}^{k} (w_{0j'} b_{j'})^2 = pd_0 \cdot 1/\alpha. \qquad (16)$$

All but 3t of the batches may be removed, such that the sum of sizes of the remaining batches is at least ¾ times as large. Let [r, r'] be the delay interval corresponding to batch $B_0$. There may be one batch per processor whose process starts before r and does not finish until after r. At most p batches may be kept, and in addition, the first at-most-two batches for each table that intersect with this interval may be kept. The contribution of the other batches, however many they might be, may be small. Consider the third (and higher) batches performed in this interval corresponding to a particular table. Their original tasks start no earlier than r and their release times do not exceed r'. The former is true, since otherwise, such pieces would be part of the first or second batch of this particular table; call them $B_1$ and $B_2$. However, suppose there exists an update J that starts before r and is not included in $B_1$ or $B_2$. As it is not included in $B_1$ it preferably would have been released after the start of $B_1$. The batch $B_2$ cannot include any update released before r. So if it does not contain J, it should be empty, which is a contradiction. Hence, the total length of these batches (third and later) is no more than $d_0$, as they only include jobs whose start and end times are inside the delay interval [r, r']. Now $$td_0 \leq pd_0/(4\alpha), \text{ by definition of } \alpha. \quad (17)$$

In conjunction with (16), the total (unsquared) length of the remaining at-most-3t batches is at least $pd_0/\alpha - (¼)pd_0/\alpha = (¾)pd_0/\alpha$. Considering that generally:

$$\sum_{i=1}^{N} x_i^2 \geq \frac{\left(\sum_{i=1}^{N} x_i\right)^2}{N} \quad (18)$$

it may be inferred that the sum of squares of the at-most-3t leftover tasks is at least $(¾pd_0\alpha)^2/(3t)$, which exceeds $p^2 d_0^2/(6t\alpha^2)$.

To show that each batch receives a sufficient budget, let the "depth" of a node be the maximum number of arcs on a path from that node to a node of outdegree 0. The punctual nodes are the only nodes of outdegree 0. Induction on the depth of nodes may be used to prove, for any node $B_i$ of depth at most $\Delta$, that $$(c_i + d_i) \leq \sum_{j \in B_p} v_{ij} b_j^2$$

For sinks, i.e., nodes of outdegree 0, the claim is apparent, since $$(c_i + d_i)^2 \leq \frac{1}{\beta^2} c_i^2 \text{ by definition of punctuality} \quad (19)$$

-continued $$\leq \frac{1}{\beta^2} b_i^2 \text{ by (2)} \quad (20)$$

$$= v_{ii} b_i^2 \text{ and by definition of } v_{ii} \quad (21)$$

$$= \sum_{j \in B_p} v_{ij} b_j^2 \text{ because } v_{ij} = 0 \text{ if } j \neq i. \quad (22)$$

Take a tardy batch $B_0$ of depth $\Delta$ whose immediate children are $B_1, \ldots, B_k$. For any child $B_i$ of $B_0$, whose depth has to be less than $\Delta$, there is the following:

$$b_i^2 \leq (c_i + d_i)^2 \quad (23)$$

$$\leq \sum_{j \in B_p} v_{ij} b_j^2 \quad (24)$$

Now we prove the inductive assertion as follows.

$$(c_0 + d_0)^2 \leq \left(\frac{1}{1-\beta}\right)^2 d_0^2 \text{ by the definition of tardiness} \quad (25)$$

$$= \gamma \frac{p^2 d_0^2}{6t\alpha^2} \text{ by the choice of } \lambda \quad (26)$$

$$\leq \gamma \sum_{j'=1}^{k} (w_{0j'} b_j)^2 \text{ from above; and} \quad (27)$$

$$\leq \sum_{j'=1}^{k} \gamma w_{0j'}^2 \sum_{j \in B_p} v_{j'j} b_j^2 \text{ by (23) and (24) above.} \quad (28)$$

Therefore:

$$\leq \sum_{j \in B_p} v_{0j} b_j^2 \quad (29)$$

from (15) above, and because for $j \in B_p$, the first arc of the paths can be factored out to get $$v_{oj} = \sum_{j'=1}^{k} (\gamma w_{0j'}^2) v_{j'j}; \quad (30)$$

More precisely, let $P_{e,j}$, for an arc $e=(u, v)$ and a node j, be the set of all directed paths from u to j whose second node is v. Then, $$v_{oj} = \frac{1}{\beta^2} \sum_{p \in P_{0j}} \prod_{e \in p} (\gamma w_e^2) \text{ by (15)} \quad (31)$$

$$= \sum_{j'=1}^{k} \frac{1}{\beta^2} \sum_{p \in P_{j'j}} \prod_{e \in p} (\gamma w_e^2) \text{ since } P_{oj} = \bigcup_{j'=1}^{k} P_{ej',j} \text{ and } P_{e,j} \cap P_{e',j} = \emptyset \text{ for } e \neq e' \quad (32)$$

-continued $$= \sum_{j'=1}^{k} \gamma w_{e_{j'}}^2 \frac{1}{\beta^2} \sum_{p \in P_{j'j}} \prod_{e \in p} (\gamma w_e^2) \text{ and}$$

$$= \sum_{j'=1}^{k} (\gamma w_{0j'}^2) v_{j'j} \text{ by (15)}. \quad (34)$$

The second property of a charging scheme says that the budget available to a batch should not be overused.

For any batch $B_j$, $$\sum_{i \in B} v_{ij} \leq \lambda := \frac{1}{\beta^2(1 - t\gamma)}$$

and $t\gamma < 1$.

The delay intervals corresponding to batches of a single table may be disjoint, as shown: The delay interval of a batch $B_i \in B$ starts at the end of $J_i$. Suppose this interval intersects one of $B_j, j \neq i$, from the same table. Without loss of generality, assume that $J_j$ starts at least as late as $J_i$. Thus, as $J_i$ and $J_j$ intersect, $J_j$ should have been released before the delay interval of $B_i$ ends. This is in contradiction with the definition of batching, as it implies $J_j$ should be included in batch $B_i$.

To demonstrate the second property of the charging scheme, let the height of a node be the maximum number of arcs on a path from any node to that node. Induction on the height of nodes can be used to demonstrate for any node $B_j$ of height H, $$\sum_{i \in B} v_{ij} \leq \lambda$$

It may be noted that:

$$t\gamma = \frac{6t^2\alpha^2}{p^2} \left(\frac{1}{1-\beta}\right)^2 \quad \text{by (14) above, and} \quad (35)$$

$$\leq \delta < 1 \quad \text{by definition of } \alpha, \delta \text{ above.} \quad (36)$$

For a batch $B_j$ at height zero (a source, i.e., a node of indegree 0), the definition of $v_{ij}$, which involves a sum over all $i \rightarrow j$ paths, would be 0 unless $i=j$, in which case $v_{ij}=1/\beta^2$. Now the claim that $\lambda \geq 1/\beta^2$ follows from the definition of $\lambda$ and the fact that $t\gamma < 1$.

As above, the last arc of the path can be factored out, except for the zero-length trivial path. Consider $B_0$, whose immediate ancestors are $B_1, \ldots, B_k$ with arcs $e_1=(B_1, B_0), \ldots, e_k=(B_k, B_0)$, respectively. These incoming arcs may come from batches corresponding to different tables. However, it may be shown that the sum $\Sigma_{i=1}^{k} w_{e_i}$ of the weights of these arcs is at most t. More precisely, it may be shown that the contribution from any table is no more than one. Consider that $w_{ei}$ denotes the fraction of batch $B_0$ which is in the delay interval of batch $B_i$. As the delay intervals of these batches are disjoint, as above in some cases, their total weight cannot be more than one and hence the total sum over all tables cannot exceed t.

Further, for any e, it may be shown that $w_e < 1$. So $$\sum_{i=1}^{k} w_{ei}^2 \leq t. \quad (37)$$

As the height of any ancestor $B_i$ of $B_0$ is strictly less than H, the inductive hypothesis ensures that the total load $\Sigma_{j \in B} v_{ji}$ on $B_i$ is no more than $\lambda$. The total load on $B_0$ is:

$$\sum_{i \in B} v_{i0} = \frac{1}{\beta^2} + \sum_{i \in B, i \neq 0} \sum_{i'=1}^{k} \gamma w_{i'0}^2 v_{ii'} \quad (38)$$

by definition of $v_{ij}$ in (15) above, noting that $v_{00}=1/\beta^2$ and the fact that for any $i \neq 0$, any path from $B_i$ to $B_0$ visits another batch $B_{i'}$, which is an immediate ancestor of $B_0$, $$= \frac{1}{\beta^2} + \gamma \sum_{i'=1}^{k} w_{i'0}^2 \left(\sum_{i \in B} v_{ii'}\right), \quad \text{by (38)} \quad (39)$$

Now $$\sum_{i \in B} v_{ii'} \leq \lambda$$

by the inductive hypothesis applied to i' and (39)

$$\sum_{i'=1}^{k} w_{i',0}^2 \leq t$$

by (37), then $$\sum_{i \in B} v_{i0} \leq \frac{1}{\beta^2} + \gamma t \lambda \quad (40)$$

by (37) and the inductive hypothesis $$= \lambda, \quad (41)$$

by the choice of $\lambda$, as desired. The matrix $(v_{ij})$ is a charging scheme, as shown above.

Above the staleness measure is twice between the penalty measure and the lower bound LOW. Since the main theorem shows that these two outer values are close, staleness should also be close to the lower bound.

It can be argued that LOW is also a lower bound on staleness. Staleness is an integration on how out-of-date each table is. Tables can be considered separately. For each particular table, one can look at portions corresponding to different updates. If an update starts at time r and ends (i.e., is released) at r', then at point r≤x≤r', the staleness is no less than x. Thus, the total integration is at least $\frac{1}{2}\Sigma_{i \in A} a_i^2$. Staleness in most or all cases cannot be larger than half the penalty paid. For each specific table, the time frame is partitioned into intervals, marked by the times when a batch's performance is finished. The integration diagram for each of these updates consists of a trapezoid. It can be denoted by y the staleness value at time r. The staleness at r' is then y+r'−r. Total staleness for this update is $$\rho^* = (r' - r) \frac{y + y + r' - r}{2} \tag{42}$$

$$\leq \frac{(r' - r + y)^2}{2}, \tag{43}$$

as $y \geq 0$ and $AB \leq (A+B/2)^2$ for $A, B \geq 0, = \rho$, (44)

where ρ is the penalty for this batch according to our objective.

There is no known online algorithm which is competitive with respect to stretch. With regard to this, suppose there is one processor and two tables. A large update of size S1 arrives on the first table. At some point, it needs to be applied. As soon as this is done, a very small update of size $S_2$ appears on the second table. Since preemption is not allowed, the small update needs to wait for the large update to finish. The stretch would be at least $\alpha S_1/S_2$. But if there was advanced knowledge of this, the larger job could be delayed until completion of the smaller update.

Even if there is an offline periodic input, the situation might be less than optimal. In some cases, stretch can be large. Again, if there are two tables and one processor, one table may have a big periodic update of size $S_1$. The other table may have small periodic updates of size $S_2$. At some point, an update from table one should be performed. Some updates from table two may arrive during this time and need to wait for the large update to finish. So their stretch is at least $a(S_1-S_2)/S_2$.

The above examples all work with one processor, but similar constructions show that with p processors, the stretch can be as large as desired because it is not bounded. To do this, p+1 tables and p processors are needed. The $i^{th}$ table has a period which is much larger than the $(i+1)^{th}$ one. The argument above was a special case for p=1.

The identity of a condition that allows stretch to be bounded is sought. Suppose each table has updates of about the same length (i.e., it is semi-periodic). In other words, the updates from each table have size in [A, cA] for some constant c. Any constant c would work (yet give a different bound finally), but c=2 is picked for ease of exposition. Further assume that tables can be divided into a few (g, to be precise) groups, such that periods of updates in each group is about the same thing (the same condition for the update lengths being in [A, 2A]). Then at least as many processors are needed as compared to the number of groups. Otherwise, there can be examples to produce arbitrarily large stretch values. Additionally, a reasonable assumption can be made that p is much larger than g. Each group is assigned some processors, in an amount proportional to their load. That is, the number of processors given to each group is proportional to the number of tables in the group. The algorithm is given in FIG. 5. After the assignment of processors to groups, each group runs a specific opportunistic algorithm. This algorithm, at each point when a processor becomes idle, picks the batch corresponding to the oldest update.

At that point, each group forms an independent instance. Let us assume that for the t' tables in a specific group with p' processors, the upper bound is $\alpha \leq p'/8t'$ on each $\alpha_i$.

It can be shown that if all the updates of a group have sizes between A and 2A, and $\alpha \leq p'/8t'$, stretch is bounded by 3. Taking any one task, it can be shown it cannot wait for long, and thus its stretch is small. Note that stretch also considers the effect of batching this task with some other tasks of the same table. To this end, the execution of tasks is divided into several sections. Each section is either tight or loose. A tight section is a maximal time interval in which all the processors are busy. Loose is defined in the example as not tight.

Jobs can be ordered according to their release times, and ties may be arbitrarily decided. Let $\omega_i$ denote the wait time (from release time to start of processing) of the $i^{th}$ job (say, $J_i$). Let $\theta_k$ be the length of the $k^{th}$ tight section (call it $S_k$). Recursive bounds can be established on values $\omega_i$ and $\theta_k$, and then induction may be used to prove they cannot be too large. There is inter-relationship between them, but the dependence is not circular. Generally, $\theta_k$ depends on $\omega_i$ for jobs which are released before Sk starts. On the other hand, $\omega_i$ depends on $\omega_{i'}$ for i'<i and $\theta_k$ for $S_k$ in which $J_i$ is released.

Let $i_k$ be the index of the last job released before $S_k$ starts. The topological order of recursive dependence is then as follows: the $\omega_i$'s are sorted according to i, and $\theta_k$ is placed between $\omega_{i_k}$ and $\omega_{1+i_k}$. The recursive formulas developed below relate the value of each variable to those to its left, and hence, circular dependence is avoided.

To derive a bound on $\theta_k$, one can look more closely at the batches processed inside $S_k$. Let r and r' be the start and end time of the section $S_k$. These batches correspond to updates which are released before r'. Let the so-called "load" at time r be the total amount of updates (released or not) until time r that has not yet been processed. Part of a batch that is released might have been processed (although its effect would not have appeared in the system yet). After half of processing time is passed, it can be considered that half of the batch has been processed. Updates which have not been released, but have a start time before r, may be considered to be part of the load (not all of it, but only the portion before r). The contribution to load by any single table is at most $2A + \max_{i \leq i_k} \omega_i$. There are at least three cases to consider. First, if no batch of the table is completely available at time r, the contribution $X \leq 2A$; that is, there can only be one update which has not yet been released. Second, if a batch is waiting until time r, then $X \leq 2A + \max_{i \leq i_k} \omega_i$, since the length of the batch is the actual contribution. However, if a batch is running at time r, let z be the time at which its processing started. In most or all cases, $z \leq r$ and the processing of the batch continues up to at least time r. The load is $$X \leq (r - z) + \left(2A + \max_{i \leq i_k} \omega_i\right) - (r - z)/\alpha \tag{45}$$

where the first term corresponds to a (possibly not yet released) batch which is being formed while the other batch is running, the second term bounds the length of the running batch and the last term takes out the amount of load that is processed during the period from z to r. Noting that $\alpha \leq 1$, equation (45) gives $X \leq 2A + \max_{i \leq i_k} \omega_i$.

Hence, the total load at time r is at most $t(2A+\max_{i \leq i_k} \omega_i)$. Yet, there can be an additional load of $t\theta_k$ which corresponds to the updates inside $S_k$. Thus, all the batches to be processed during $S_k$ can be processed to get:

$$2At + t\max_{i \leq i_k} \omega_i + t\theta_k \geq \theta_k p/\alpha. \qquad (46)$$

Rearranging yields:

$$\theta_k \leq \frac{(2A + \max_{i \leq i_k} + \omega_i)t}{\frac{p}{\alpha} - t}, \qquad (47)$$

Inequalities for $\omega_i$ may be considered. Without loss of generality, consideration is made of the waiting time for the first update of a batch. It may be noted that they have the largest wait time among all the updates from the same batch. If a task has to wait, it should have one of two reasons. Either all the processors are busy; or another batch corresponding to this table is currently running Consider two cases:

The first case is when $J_i$ is released in the loose section before $S_k$. If $\omega_i > 0$, it is waiting for another batch from the same table. The length of the batch is at most $\max_{i' < i} \omega_{i'} + 2A$. If as soon as this batch is processed at time $\tau$, $J_i$ processing may begin. Any job with higher priority than $J_i$ should have been released before it is. When $J_i$ is released, all these other higher-priority jobs are either running, or waiting for one batch of their own table. So, their count cannot be more than p−2 (there is one processor working on the table corresponding to $J_i$ and one for each of these higher-priority jobs, and at least one processor is idle). In other words, there are at most p−2 tables which might have higher priority than $J_i$'s table at time $\tau$. Thus, $J_i$ cannot be further blocked at time $\tau$. Hence, $$\omega_i \leq \alpha(\max_{i' < i} \omega_{i'} + 2A). \qquad (48)$$

The other case is when $J_i$ is released inside the tight section $S_k$. If $J_i$ is processed after $\omega > \theta_k$ time units pass since the start of $S_k$, a batch from the same table has to be under processing at the moment $S_k$ finishes; otherwise, $J_i$ would start at that point. However, processing of this batch must have started before $J_i$ was released; or else, $J_i$ has to be part of it. Moreover, similarly to the argument for the first case, it can be shown that as soon as the processing of the blocking batch from the same table is done, the batch corresponding to job $J_i$ will start to be processed. More precisely, there can be at most p−1 other batches with higher priorities than $J_i$. So they cannot block $J_i$ at time $\tau$ when the lock on its table is released. Hence, $$\omega_i \leq \max\{\theta_k, \alpha(\max_{i' < i} \omega_{i'} + 2A)\}, \qquad (49)$$

since, it either waits for the tight section to end, or for a batch of its own table whose length cannot be more than $\max_{i' < i} \omega_{i'} + 2A$.

One can pick of $\omega^* = \theta^* = A/3$ and use induction to show that $\forall i: \omega_i \leq \omega^*$ and $\forall k: \theta_k \leq \theta^*$, in part because $\alpha \leq 1/8$ and $p/\alpha \geq 8t$. Note that the right-hand side of Equations (47), (49) and (48) would be no more than $\theta^* = \omega^*$ if one replaces these values for the $w_i$ and $\theta_k$ values in the formula. It only remains to observe that the dependence is indeed acyclic, which is clear by the ordering and by the fact that each formula uses the values to its left in the ordering.

The length of a batch is at most $A'=A/3 \leq 7/3A$, where the first term comes from length of the first job in the batch ($A \leq A' \leq 2A$), and the second term comes from the bound on its wait time. The resulting maximum stretch for any update piece would be bounded by $7/3(1+\alpha) < 3$.

The algorithm preferably keeps the stretch low. The algorithm in FIG. 5 can keep the stretch below 3 if $$\alpha \leq \frac{p - g}{8t}.$$

Figure 5:
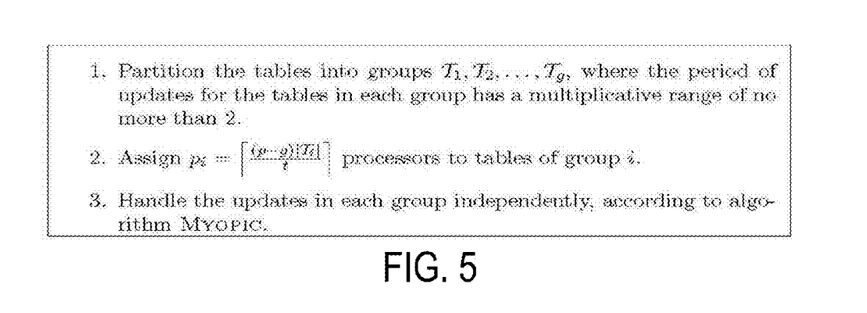
FIG. 5 illustrates algorithms related to minimizing staleness values for data tables.

If the sum of $(p-g)|T_i|/t$ for different groups is p−g, then $\Sigma_i[(p-g)|T_i|/t \leq p$. Thus, one would use, at most, as many processors as were available. Then, in each group $p' \geq (p-g)t'/t$. So the following applies: $\alpha \leq p'/8t'$. The arguments above, regarding if all of the updates of a group have sizes between A and 2A, apply to show that stretch is bounded by 3.

So-called "weighted staleness" can also be considered. That is, each table has a weight $w_i$ that should be multiplied by the overall staleness of that table. This takes into account the priority of different tables. In an online setting, no known algorithm can be competitive with respect to weighted staleness. As soon as a job from the low priority table is scheduled, a job appears from the high priority table which will then cost too much.

In the semi-periodic instance, weighted staleness of the algorithm in FIG. 5 is no more than nine times that of OPT. If $w_i$ is a weights for staleness definition, $\Sigma_{i \in A} w_i a_i^2$ is a lower bound on the weighted staleness. As stretch is less than 3, the weighted staleness cannot be larger than $3^2 = 9$ times that of the optimum.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method of updating data tables stored in a data warehouse, the method comprising:
   storing, in memory, a plurality of data tables;
   detecting, by a processor, incoming data for updating the plurality of data tables;
   generating, by the processor, an update request associated with each data table in the plurality of data tables;
   determining a calculated staleness for a portion of the plurality of data tables;
   scheduling updates to the portion of the plurality of data tables based on the calculated staleness;
   determining a stretch value for each one of the data tables in the portion of the plurality of data tables, the stretch value indicative of a maximum ratio between a duration of time a corresponding one of the updates waits until processing is finished and a length of the corresponding one of the updates, wherein scheduling data table updates is based at least in part on the stretch value; and
   distributing the updates among a plurality of processors to minimize the calculated staleness;
   transforming the portion of the plurality of data tables to include a different portion of the incoming data based on the scheduling.

2. The method of claim 1, further comprising determining a previous update of the portion of the plurality of data tables.

3. The method of claim 1, further comprising determining the update request is non-preemptible.

4. The method of claim 1, further comprising batching an accumulation of update requests.

5. The method of claim 1, further comprising performing the updates in a real-time data.

6. The method of claim 5, further comprising responsive to receiving a user request for the portion of the plurality of data tables.

7. The method of claim 1, further comprising weighting a first portion of the plurality of data tables higher than a second portion of the plurality of data tables.

8. The method of claim 1, further comprising determining the calculated staleness is a priority weighted staleness.

9. The method of claim 8, further comprising multiplying a first data table staleness by a first weight and multiplying a second data table staleness by a second weight.

10. The method of claim 1, further comprising appending new data to one of the plurality of data tables.

11. The method of claim 1, further comprising performing the updates at variable intervals.

12. A non-transitory computer readable medium storing computer instructions that when executed cause a processor to perform a method for managing a plurality of data tables in a data warehouse, the method comprising:
   maintaining the plurality of data tables in the data warehouse;
   receiving requests to update, with incoming data, a portion of the plurality of data tables;
   generating update requests corresponding to the requests to update;
   determining calculated stalenesses for individual data tables of the portion of the plurality of data tables;
   ranking the calculated stalenesses;
   scheduling updates to the portion of the plurality of data tables based on the calculated stalenesses;
   determining a stretch value for each one of the individual data tables in the portion of the plurality of data tables, the stretch value indicative of a maximum ratio between a duration of time a corresponding one of the updates waits until processing is finished and a length of the corresponding one of the updates, wherein scheduling data table updates is based at least in part on the stretch value;
   distributing the updates among a plurality of processors to minimize the calculated stalenesses; and
   transforming the portion of the plurality of data tables to include a different portion of the incoming data based on scheduling of the updates and the update requests.

13. The non-transitory computer readable medium of claim 12, further comprising weighting a first portion of the plurality of data tables higher than a second portion of the plurality of data tables, and wherein the scheduling is at least in part responsive to a result of the weighting.

14. The non-transitory computer readable medium of claim 12, further comprising appending the incoming data to the portion of the plurality of data tables.

15. A server for managing a data warehouse, the server comprising:
   a processor; and
   a memory storing instructions that when executed cause the processor to perform operations, the operations comprising:
   receiving incoming data for updating a plurality of data tables;
   an interface for receiving incoming data for updating the plurality of data tables
   determining calculated stalenesses for a portion of the plurality of data tables;
   weighting a portion of the calculated stalenesses;
   scheduling updates to the portion of the plurality of data tables based on the calculated stalenesses;
   determining a stretch value for each one of the individual data tables in the portion of the plurality of data tables, the stretch value indicative of a maximum ratio between a duration of time a corresponding one of the updates waits until processing is finished and a length of the corresponding one of the updates, wherein scheduling data table updates is based at least in part on the stretch value; and
   distributing the updates among a plurality of processors to minimize the calculated stalenesses.

16. The server of claim 9, wherein the operations further comprise batching the updates.

* * * * *